March 26, 1963 W. H. MYERS ETAL 3,082,503
METHOD OF CO-MOLDING A METAL INSERT IN A BRICK
Filed Feb. 8, 1961 2 Sheets-Sheet 1
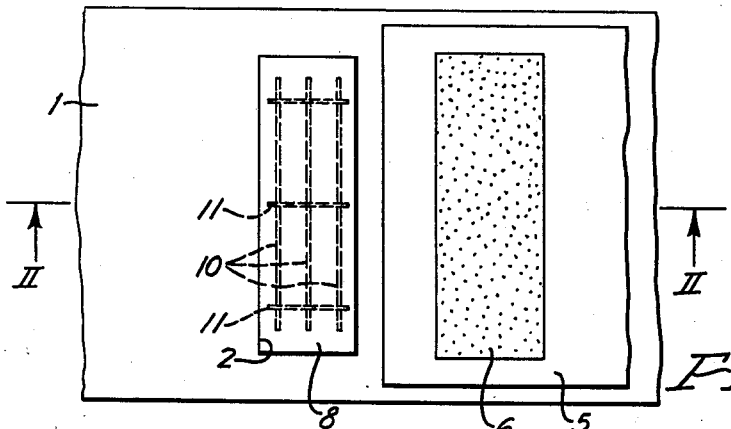
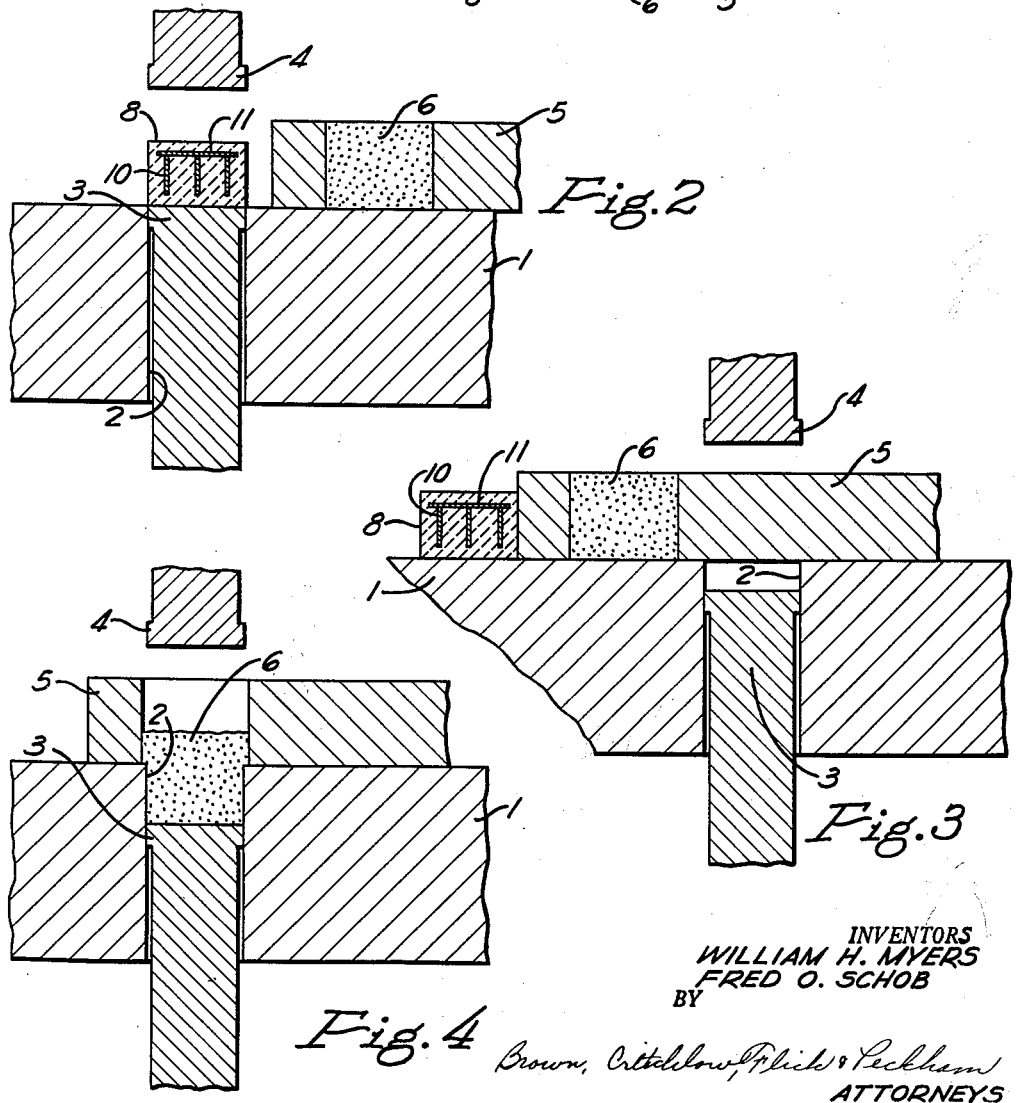
INVENTORS
WILLIAM H. MYERS
FRED O. SCHOB
BY
Brown, Critchlow, Flick & Peckham
ATTORNEYS

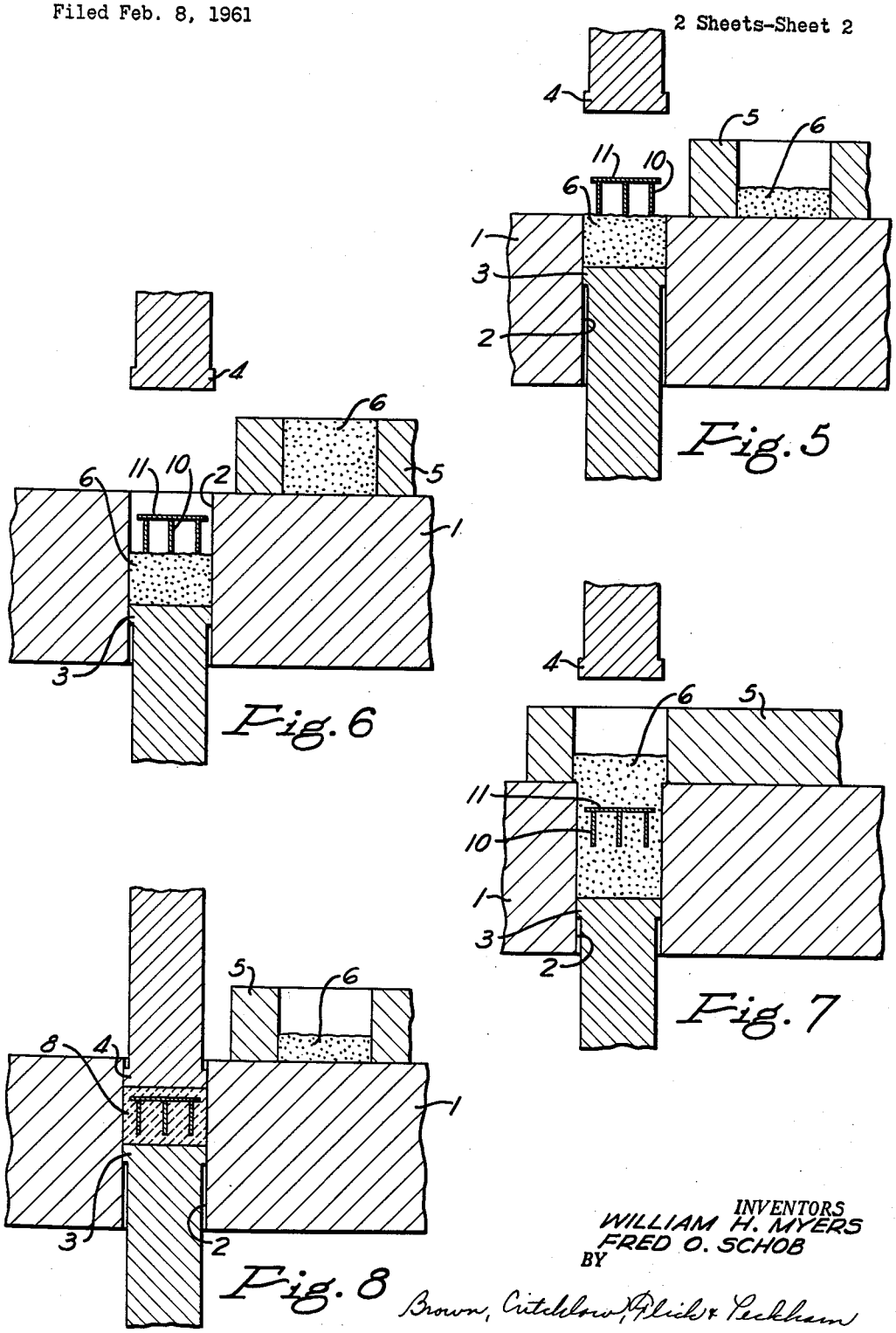

з,082,503
Patented Mar. 26, 1963

3,082,503
METHOD OF CO-MOLDING A METAL
INSERT IN A BRICK
William H. Myers, Glen Burnie, Md., and Fred O.
Schob, Pittsburgh, Pa., assignors to Harbison-Walker
Refractories Company, Pittsburgh, Pa., a corporation
of Pennsylvania
Filed Feb. 8, 1961, Ser. No. 87,820
3 Claims. (Cl. 25—154)

This invention relates to the molding of bricks in a press, and more particularly to the molding of bricks containing metal inserts.

It is common practice to mold metal inserts, especially metal plates, in refractory bricks. A common way of doing this is to magnetize the upper pad of the brick press so that the pad can support the metal insert while descending into the mold cavity to press the insert into the granular material therein and simultaneously compact the material to form a brick. With such a system, the upper surface of the metal insert necessarily remains exposed, flush with the top of the brick, because the engagement of the insert with the top pad prevents covering the top of the insert with the brick material.

It is among the objects of this invention to provide a method of molding a metal insert in a brick, in which the insert can be completely covered on all sides by the granular brick material.

In accordance with this invention, a charge of granular brick material is delivered to the mold cavity of a brick press. A metal insert is then placed on the material, after which the insert is covered with another charge of the brick material. One way of accomplishing this is to fill the mold cavity while the bottom pad is only partly lowered, then lower the material before or after the insert has been placed on it, and then fill the cavity to cover the insert. The next step is to press the material in the mold cavity to form a brick. In doing so, the metal insert will be embedded in the brick.

The invention is illustrated in the accompanying drawings, in which

FIG. 1 is a fragmentary plan view of a brick press, from which our brick is about to be removed;

FIG. 2 is a fragmentary vertical section taken on the line II—II of FIG. 1; and

FIGS. 3 to 8 are similar sections showing further steps in the process of making the brick.

Referring to FIGS. 1 and 2 of the drawings, the bed 1 of a brick press is provided with a rectangular mold cavity 2, in which there is a bottom pad 3 that can be moved up and down in a well-known manner. Above the cavity there is a top pad 4 that is movable down into the cavity as the machine goes through its cycle. Behind the mold cavity there is a charging box 5 that can be slid forward across the press bed to deposit a charge of granular brick material 6 on the bottom pad inside the cavity. The charger receives batch material from any suitable source of supply (not shown) such as a hopper or conveyor.

After a brick 8 has been formed and the bottom pad has lifted it to the top of the press bed, the charger 5 also serves to push the brick off the pad and onto the bed in front of the mold cavity, as shown in FIG. 3. As soon as the brick leaves the bottom pad, the latter starts to move down into the cavity again. The pad stops at an intermediate level as shown in FIG. 4, and the cavity above it is filled with granular material as the charging box moves back across it.

After the charger has been retracted, a metal insert is placed on the charge in the mold cavity, either manually or automatically. The insert may take any desired form; such as three parallel plates 10 standing on edge and connected at the top by cross wires 11 welded to them as shown in FIGS. 1 and 5. Another possibility is a horizontal plate laid on top of the material in the cavity, or a vertical plate pressed down into the material just far enough to maintain itself upright.

If desired, the insert can be set on top of the brick material before that material has been lowered in the mold cavity, as shown in FIG. 5. The bottom pad then is lowered further in the mold cavity, the brick charge and the metal insert descending with it as shown in FIG. 6. The pad is lowered far enough to lower the top of the insert below the top of the press bed, and also far enough to receive the rest of the charge that is necessary for making a brick.

The charger, which has been refilled with granular brick material in the meantime, then is moved forward across the mold cavity again to deposit a second charge of material in the cavity in order to fill it and completely cover the metal insert, as shown in FIG. 7. After the charger has been retracted, the top pad 4 is moved down into the cavity and the bottom pad is moved up to press the granular material between them into the form of a brick 8, as shown in FIG. 8. The insert will remain surrounded by the brick material. If the insert has been centered in the mold cavity, it will be completely embedded in the brick. However, even if one end of cross wires 11, or one end of plates 10 or projections thereon, engage side walls of the cavity, the insert will be substantially completely embedded in the brick.

After pressing, the two pads rise to lift the finished brick to the top of the mold cavity, where it can be moved from the bottom pad onto the press bed in the manner previously described in connection with FIG. 3. The cycle is then repeated for making the next brick.

In some cases it may be preferred to postpone setting the metal insert on the charge of refractory material in the mold cavity until after that charge has been lowered. In that situation the insert would not appear in FIG. 5, but would be inserted in the mold cavity after the bottom pad 3 had been lowered, as shown in FIG. 6. The rest of the steps would be carried out in the manner described above.

According to the provisions of the patent statutes, we have explained the principle of our invention and have illustrated and described what we now consider to represent its best embodiment. However, we desired to have it understood that, within the scope of the appended claims, the invention may be practiced otherwise than as specifically illustrated and described.

We claim:
1. That method of co-molding a metal insert in a brick which includes the steps of:
    (1) lowering a bottom pad in a brick mold to a predetermined point therein to form an open topped cavity;
    (2) completely filling the resulting cavity with unconsolidated granular brick material;
    (3) exposing the top of the cavity filled with unconsolidated brick material;
    (4) placing a metal insert on the top of the unconsolidated material in the filled cavity;
    (5) further lowering the bottom pad,
        (a) to a predetermined lower position to form a new cavity,
        (b) which positions the upper extremities of the insert a substantial distance below the open top of the mold,
        (c) which distance is sufficient to allow an additional quantity of unconsolidated brick material to be subsequently placed therein to a depth which, after subsequently pressing, will completely cover the upper extremities of the insert;
(6) again placing unconsolidated brick material in the mold
   (a) to a level which completely fills the new cavity,
   (b) and completely buries the insert such that substantially no portion thereof is exposed;
(7) and exerting pressure on the unconsolidated brick material and included insert to form a self-sustaining body having a metal insert substantially completely embedded therein.

2. That method of co-molding a metal insert in a brick which includes the steps of:
(1) lowering a bottom pad in a brick mold to a predetermined point therein to form an open topped cavity;
(2) completely filling the resulting cavity with unconsolidated granular brick material;
(3) exposing the top of the cavity of unconsolidated brick material;
(4) further lowering the bottom pad,
   (a) to a predetermined lower position to form a new cavity,
   (b) said new cavity being of sufficient depth as to allow an additional quantity of unconsolidated brick material to be subsequently placed therein to a depth which, after subsequent pressing, will completely cover the upper extremities of an insert to be placed in said new cavity;
(5) placing a metal insert on the top of the unconsolidated material in the new cavity;
(6) again placing unconsolidated brick material in the mold,
   (a) to a level which completely fills the new cavity,
   (b) and completely buries the insert such that substantially no portion thereof is exposed;
(7) and exerting pressure on the unconsolidated brick material and included insert to form a self-sustaining body having a metal insert substantially completely embedded therein.

3. That method of co-molding a metal insert in a brick which includes the steps of:
(1) lowering a bottom pad in a brick mold to a predetermined point therein to form an open topped cavity;
(2) completely filling the resulting cavity with unconsolidated granular brick material;
(3) further lowering the bottom pad,
   (a) to a predetermined lower position to form a new cavity,
   (b) said new cavity being of sufficient depth as to allow an additional quantity of unconsolidated brick material to be subsequently placed therein to a depth which, after subsequent pressing, will completely cover the upper extremities of an insert to be placed in said new cavity;
(4) exposing the top of the new cavity;
(5) placing a metal insert on the top of the unconsolidated material in the new cavity;
(6) again placing unconsolidated brick material in the mold,
   (a) to a level which completely fills the new cavity,
   (b) and completely buries the insert such that substantially no portion thereof is exposed;
(7) and exerting pressure on the unconsolidated brick material and included insert to form a self-sustaining body having a metal insert substantially completely embedded therein.

References Cited in the file of this patent

UNITED STATES PATENTS

| | | |
|---|---|---|
| 2,218,196 | Hagar | Oct. 15, 1940 |
| 2,268,965 | Schumann | Jan. 6, 1942 |
| 2,674,008 | Van der Pyl | Apr. 6, 1954 |
| 2,972,784 | Shonka | Feb. 28, 1961 |
| 2,975,500 | Hosbein | Mar. 21, 1961 |

OTHER REFERENCES

Noftsinger: abstract of patent application 697,592, OG Vol. 645, page 328, April 3, 1951.